(12) United States Patent
Eguchi

(10) Patent No.: US 7,757,737 B2
(45) Date of Patent: Jul. 20, 2010

(54) FILM PASTING DEVICE

(75) Inventor: Toshimasa Eguchi, Yokohama (JP)

(73) Assignees: Kuraray Co., Ltd., Kurashiki-shi (JP); JSR Corporation, Chuo-ku (JP); Sumitomo Chemical Co., Ltd., Chuo-ku (JP); Dai Nippon Printing Co., Ltd., Shinjuku-ku (JP); Toppan Printing Co., Ltd., Taito-ku (JP); NEC Corporation, Minato-ku (JP); Hitachi Chemical Co., Ltd., Shinjuku-ku (JP)

(*) Notice: Subject to any disclaimer, the term of this patent is extended or adjusted under 35 U.S.C. 154(b) by 214 days.

(21) Appl. No.: 11/883,737

(22) PCT Filed: Mar. 29, 2005

(86) PCT No.: PCT/JP2005/005814
§ 371 (c)(1),
(2), (4) Date: Aug. 3, 2007

(87) PCT Pub. No.: WO2006/082663
PCT Pub. Date: Aug. 10, 2006

(65) Prior Publication Data
US 2008/0149275 A1    Jun. 26, 2008

(30) Foreign Application Priority Data
Feb. 3, 2005    (JP)    ............... 2005-027185

(51) Int. Cl.
*B32B 41/00*    (2006.01)

(52) U.S. Cl. ............ 156/378; 156/64; 156/360; 156/361; 156/379; 356/364; 356/928; 356/935; 435/808

(58) Field of Classification Search .......... 156/64, 156/360, 361, 378, 379; 356/364, 928, 935
See application file for complete search history.

(56) References Cited

U.S. PATENT DOCUMENTS

| | | | | |
|---|---|---|---|---|
| 3,257,894 A | * | 6/1966 | Grosjean | .......... 356/368 |
| 3,586,443 A | * | 6/1971 | Hooper | .......... 356/365 |
| 5,175,638 A | * | 12/1992 | Kanemoto et al. | ...... 349/121 |
| 5,504,581 A | * | 4/1996 | Nagata et al. | .......... 356/364 |
| 6,473,179 B1 | * | 10/2002 | Wang et al. | ........... 356/364 |

FOREIGN PATENT DOCUMENTS

JP    06300918 A    * 10/1994

* cited by examiner

*Primary Examiner*—Kat Wyrozebski
*Assistant Examiner*—Joshel Rivera
(74) *Attorney, Agent, or Firm*—Flynn, Thiel, Boutell & Tanis, P.C.

(57) ABSTRACT

To provide a device for pasting a film exhibiting dichroism and a film exhibiting birefringence at an arbitrary angle with high precision. The device for pasting a film exhibiting dichroism and a film exhibiting birefringence at an arbitrary angle comprises a detector for detecting the angle of an axis where absorption is maximum or minimum in the plane of a film exhibiting dichroism, and a detector for detecting the slow axis in the plane of a film exhibiting birefringence. An angle between the film exhibiting dichroism and the film exhibiting birefringence is controlled using the detector for a film exhibiting dichroism and the detector for a film exhibiting birefringence.

8 Claims, 7 Drawing Sheets

FILM PASTING DEVICE

TECHNICAL FIELD

The present invention relates to an apparatus used when a film having a dichroic property is laminated a film having a birefringent property at an arbitrary angle and is used when optical films are laminated each other such as when a polarization film and a retarder used to, for example, a display apparatus are laminated each other, and the like.

BACKGROUND ART

A film having a dichroic property is laminated a film having a birefringent property at an arbitrary angle as in a case in which a polarization film and a retarder are laminated each other for, for example, a liquid crystal display apparatus and the like. In a conventional film laminating apparatus, a laminating angle is controlled using the edges of films, which are visually confirmed or detected by a CCD camera and the like, as a reference or by abutting the edges of both the films against an apparatus (refer to, for example, Patent Documents 1, 2).

Patent Document 1: Japanese Patent Application Laid-Open Publication No. 2001-318375 (page 2)

Patent Document 2: Japanese Patent Application Laid-Open Publication No. 2004-148721 (page 4)

DISCLOSURE OF THE INVENTION

Problems to be Solved by the Invention

Recently, as the display quality of a display apparatus is enhanced, it is required to laminate a polarization film to a phase difference film at a bonding angle with a high accuracy. However, a conventional apparatus has a problem in that it cannot sufficiently enhance the accuracy.

Means for Solving the Problems

To overcome the above problem, the present invention is arranged as described below.

An invention according to claim 1 is characterized by a film laminating apparatus for laminating a film having a dichroic or two-color property to a film having a birefringent or double-refraction property at an arbitrary angle, wherein the film laminating apparatus is composed of a detector for the film having the dichroic property for detecting the angle of the axis thereof whose absorption is maximized or minimized in the plane thereof, and a detector for the film having the birefringent property for detecting the slow axis thereof in the plane thereof, and the angle between the film having the dichroic property and the film having the birefringent property is controlled using the detector for the film having the dichroic property and the detector for the film having the birefringent property.

The film having the dichroic property, which can be used in the present invention, is not particularly limited. Examples thereof include a polarization film, which is composed of stretched iodine-containing polyvinyl alcohol and placed between protection films of triacetyl cellulose and the like, and a polarization film composed of stretched polyvinyl alcohol containing a dichroic pigment in place of iodine, and the like.

Further, the film having the birefringent property, which can be used in the present invention, is not particularly limited. Examples thereof include retarder composed of stretched plastic films of polycarbonate, polysulfone, cycloolefin copolymer, and the like. It is also possible to use at least two films having the birefringent property after they are laminated at a different angle, and these films may be of the same type or a different type.

An invention according to claim 2 is characterized by a film laminating apparatus according to claim 1 wherein the detector for the film having the dichroic property is composed of a light source, a polarization device, and a photodetector.

An invention according to claim 3 is characterized by a film laminating apparatus according to claim 1 or 2 wherein the detector for the film having the birefringent property is composed of a light source, two polarization devices disposed orthogonal to each other, and a photodetector.

An invention according to claim 4 is characterized by a film laminating apparatus composed of an unwinder for the film having the dichroic property, an unwinder for the film having the birefringent property, a rewinder for the film having the dichroic property and/or a rewinder for the film having the birefringent property, and a device for punching out one of the film having the dichroic property or the film having the birefringent property, wherein a roll-like laminated product is manufactured by continuously carrying out laminating.

EFFECT OF THE INVENTION

With the above arrangements, the present invention has the following advantages.

According to the invention of claim 1, the angle of the axis of the film having the dichroic property at which the absorption in the plane thereof is maximized or minimized and the slow axis of the film having the birefringent property in the plane thereof can be optically detected by the detector for the film having the dichroic property and the detector for the film having the birefringent property. Since display quality is determined based on optical properties, the film having the dichroic property can be laminated the film having the birefringent property with a sufficiently high accuracy in the optical properties by laminating them while controlling the angle therebetween using the detectors.

According to the invention of claim 2, the detector for the film having the dichroic property is composed the light source, the polarization device, and the photodetector, and it is preferable to use a device composed of the light source, the polarization device, and the photodetector as a device for detecting the angle of the axis of the film having the dichroic property at which the absorption in the plane thereof is maximized or minimized because the device can be manufactured in an simple structure. The angle of the axis of the film having the dichroic property at which the absorption in the plane thereof is maximized or minimized can be detected by converting the non-polarization light emitted from a non-polarization light source, for example, an incandescent lamp, a fluorescent lamp, a xenon lamp, a light-emitting diode, and the like into linear polarization light by a conversion device, irradiating the linear polarization light onto a surface of the film, and detecting the angle of the axis of the light passed through the film at which the intensity of the linear polarization light is minimized or maximized by changing the polarizer of the linear polarization light or the angle of the film.

According to the invention of claim 3, the detector for the film having the birefringent property is composed of the light source, the two polarization devices disposed orthogonal to each other, and the photodetector, and it is preferable to use a device composed of the light source, the two polarization devices disposed orthogonal to each other and the photodetector as a device for detecting the slow axis of the film having the birefringent property in the plane thereof likewise the above mentioned because the device can be manufactured in an simple structure. The slow axis of the film having the birefringent property in the plane thereof can be detected by detecting the angle of the light passed through the film at which the intensity thereof is maximized by changing the angle between the polarization device and the film having the birefringent property using a device composed of a non-polarization light source, for example, an incandescent lamp, a fluorescent lamp, a xenon lamp, a light-emitting diode, and the like, a first polarization device for converting non-polarization light into linear polarization light, a second polarization device disposed such that the first polarization device is disposed orthogonal to the absorption axis of the second polarization device through the film having the birefringent property, and a photodetector for detecting the intensity of the light emitted from the light source and passed through the first polarization device, the film having the birefringent property, and the second polarization device.

According to the invention of claim 4, an adhesive is previously applied on any of the film having the dichroic property and the film having the birefringent property, and the films are held by being sucked by a stage having a vacuum chuck, an electrostatic chuck, and the like or by being applied with tension through rolls while controlling the angle between the films by the method described above, thereby the films can be laminated each other using a pressure plate or by a laminating method using pressure rolls.

It is possible to supply and use the film having the dichroic property and the film having the birefringent property to be laminated each other in a roll state or as sheets. Otherwise, it is also possible to supply and use one of them in the roll state and the other of them as the sheets. Further, after the film having the dichroic property is laminated the film having the birefringent property, it is possible to obtain laminated sheet products by cutting both the films or to obtain laminated product in the roll-state by cutting off only one of the films. It is preferable to supply the film having the dichroic property and the film having the birefringent property in the roll state because they can be continuously supplied. Further, it is also preferable to supply the laminated product in the roll state for the convenience of transport, storage, and the like. When the films are supplied in the roll state, they can be handled by providing an unwinder, and when the laminated product is obtained in the roll state, it can be handled by providing a rewinder. When the film on which the adhesive is previously applied is supplied and used in the roll state, it is possible to supply a roll of a release film bonded on the adhesive to the unwinder and to supply the films to a laminating portion while exfoliating the release film.

BEST MODE FOR CARRYING OUT THE INVENTION

An embodiment of a film laminating apparatus of the present invention will be explained below in detail based on drawing. Although the embodiment of the present invention shows a most preferable mode of the invention, the invention is not limited thereto.

FIG. 1 is a side elevational view of a film apparatus of the embodiment which is employed when a film having a dichroic property and a film having a birefringent property of the embodiment are supplied and used in a roll state, respectively and a laminated product is obtained in the roll state. FIG. 2 is a top view of the film laminating apparatus.

A film 12, which acts as a film having a dichroic property and is composed of a polarization film 12b having an adhesive applied thereon and composed of stretched iodine-containing polyvinyl alcohol and placed between protection films of triacetyl cellulose and the like, and a release film 12a laminated to the polarizer 12b, is unwound from an unwinder 10 for the film having the dichroic property through nip rolls 14. The release liner 12a is released from the film 12 by a release liner take-up roll 16 along the nip rolls 14, and the polarizer 12b on which the adhesive is applied is supplied onto a laminate/punch unit 24 through free rolls 20 and 22.

A light source 26 composed of an incandescent lamp, a polarization device 28, and a photodetector 30 composed of a photodiode are disposed between the free rolls 20 and 22 to detect and control the angle of the polarizer 12b. More specifically, the absorption axis of the polarization device 28 is disposed in parallel with the roll axes of the unwinder 10, the nip rolls 14, and the free rolls 20 and 22. The angle of the polarizer 12b is controlled by an axially-movable rubber grip roll 32 so that the intensity of light detected by the photodetector 30 is minimized, and then the polarizer 12b is wound by a rewinder 34 for the film having the dichroic property. These rolls and devices are mounted on and supported by a frame 36.

In contrast, a retarder 42, which acts as a film having a birefringent property, is composed of uniaxially stretched cycloolefin copolymer, and has a slow axis in an approximately machine direction of the film, is unwound from an unwinder 40 for the film having the birefringent property through nip rolls 44. The retarder 42 is supplied to a position above the polarizer 12b, to which the adhesive is applied, above the laminate-punch unit 24 at a predetermined gap through free rolls 46 and 48.

A light source 50 composed of an incandescent lamp, a polarization device 52, a polarizer 54 disposed such that the absorption axis thereof is orthogonal to the polarization device 52, and a photodetector 56 composed of a photodiode are disposed between the free rolls 46 and 48 so that the angle of the retarder 42 is detected and controlled. More specifically, the absorption axis of the polarization device 52 is disposed in parallel with the roll axes of the unwinder 40, the nip rolls 44, and the free rolls 46 and 48. The angle of the retarder 42 is controlled by a pair of axially-movable nip rolls 58 so that the intensity of light detected by the photodetector 56 is minimized, and the retarder 42 is wound by a rewinder 60 for the film having the birefringent property. These rolls and the devices are mounted on and supported by a frame 62.

The direction in which the retarder 42 is transported and the direction in which the polarizer 12b can be set to arbitrary angles by changing the angle between the frames 36 and 62 according to an object of an optical film to be manufactured. After a target angle is set as described above, the angle can be controlled with a high accuracy by optically detecting the actual angle between the films as described above and minutely adjusting it.

Both the films are laminated by the laminate/punch unit 24 and only the retarder 42 is punched out and cut off.

FIG. 3 is an enlarged view of the laminate/punch unit 24 as well as a sectional view observed from a direction from which the polarizer 12b is transported. FIG. 4 is an enlarged view of the laminate/punch unit and as well as a sectional view observed from a direction from which the retarder 42 is transported likewise.

When a pressure plate 70 moves upward, the polarizer is laminated the retarder 42 by predetermined pressure. Subsequently, a cutting blade 72 moves upward and cuts off only the retarder 42 to the width of the polarizer 12b. Next, the cutting blade 72 moves downward and returns to an initial position, and a cutting blade 78 moves downward by the thickness of the retarder 42 and cuts off only the retarder 42. At the time, the retarder 42 is punched out remaining a continuous ear portion so that the angle thereof can be controlled by the nip rolls 58. In the laminating/punching operation, transportation of the polarization film 12b and the retarder 42 is temporarily stopped.

FIG. 5 is an enlarged view of a detector for detecting the angle of the polarizer 12b. The polarization device 28 converts the non-polarization light emitted from the light source 26 as the incandescent lamp into linear polarization light. Thereafter, the photodetector 30 composed of the photodiode detects the linear polarization light through polarizer 12b.

FIG. 6 is an enlarged view of a detector for detecting the angle of the retarder 42. The polarization device 52 converts the non-polarization light emitted from the light source 50 as the incandescent lamp into linear polarization light. Thereafter, the light passed through the retarder 42 is detected by the detector 56 composed of the photodiode through the polarizer 54.

A product, which is composed of the polarizer 12b and the retarder 42 laminated polarizer 12b, is rewound by the rewinder 34 in the roll state. In contrast, the remaining ear portion from which the retarder 42 is cut off is rewound by the rewinder 60. The roll-state laminated product can be obtained as described above.

FIG. 7 shows the product composed of the retarder laminated polarizer as described above, wherein a part (a) of FIG. 7 is a plan view, and a part (b) of FIG. 7 is a side elevational view. The punched-out phase difference films 42 are laminated the continuous polarizer 12b.

INDUSTRIAL APPLICABILITY

The present invention can be used to laminate a film having a dichroic property to a film having a birefringent property at an arbitrary angle. In particular, the present invention is useful when optical films such as a polarizer and a retarder used to a display apparatus are laminated with a high accuracy.

Figure 1:
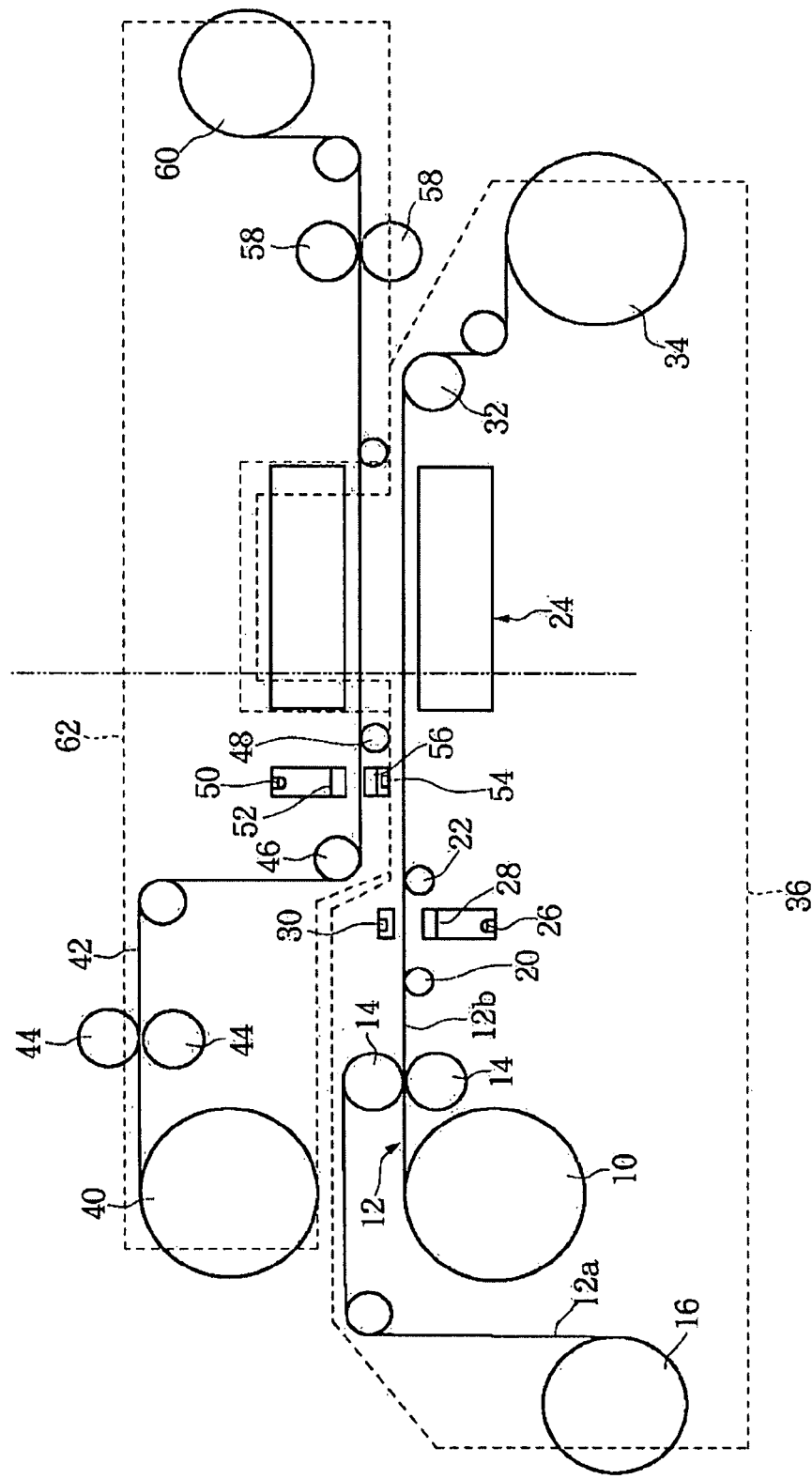
FIG. 1 is a side elevational view of a film laminating apparatus of the present invention which is employed when a film having a dichroic property and a film having a birefringent property of the present invention are supplied and used in a roll state, respectively, and a laminated product is obtained in the roll state.
Figure 2:
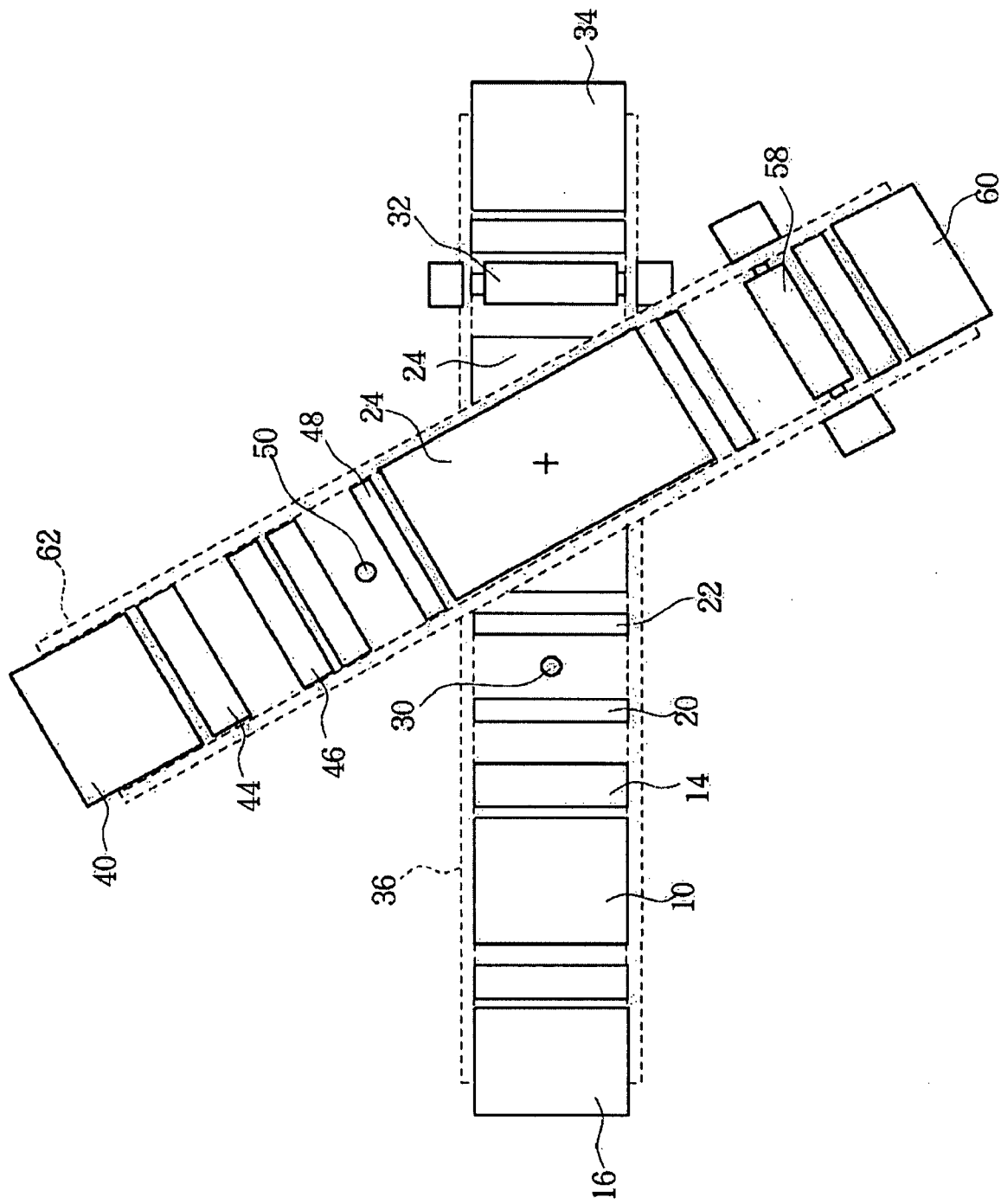
FIG. 2 is a top view of the film laminating apparatus of the present invention which is employed when the film having the dichroic property and the film having the birefringent property of the present invention are supplied and used in the roll state, respectively, and the laminated product is obtained in the roll state.
Figure 3:
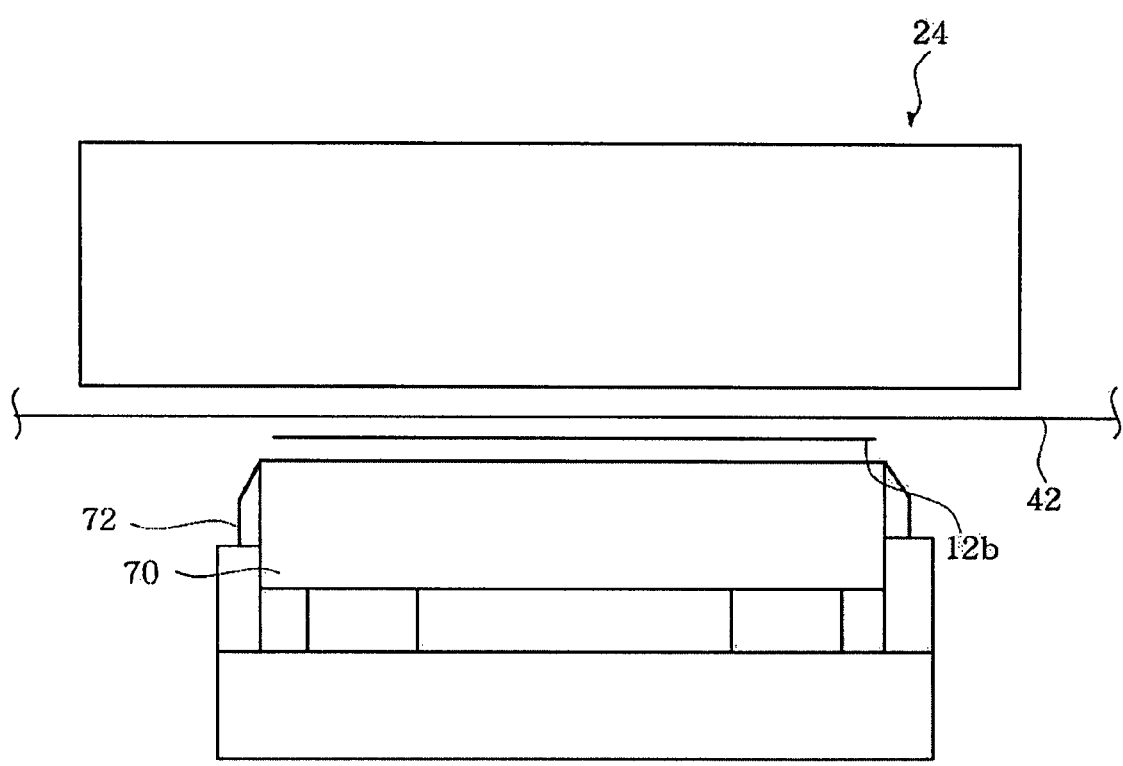
FIG. 3 is an enlarged view of a laminate/punch unit of the laminating apparatus of the present invention as well as a sectional view observed from a direction from which a polarizer is transported.
Figure 4:
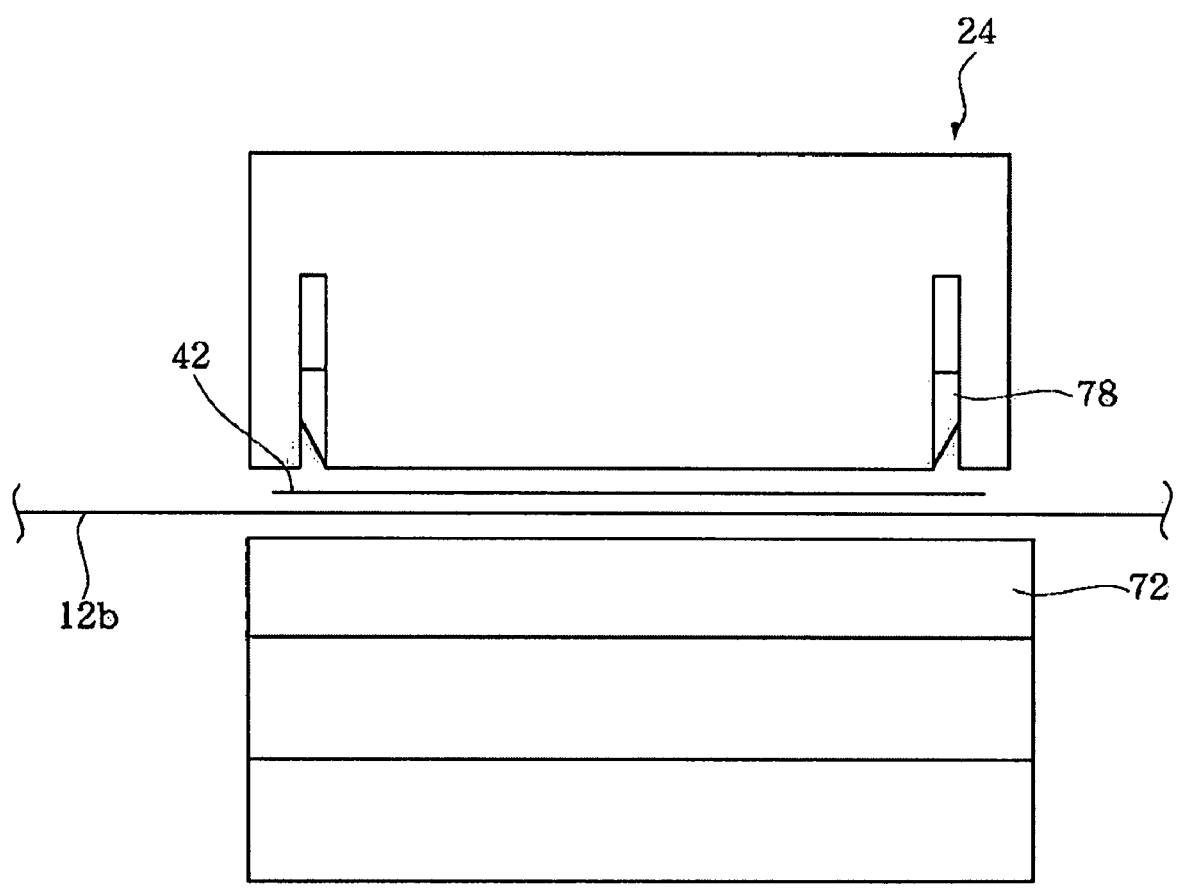
FIG. 4 is an enlarged view of the laminate/punch unit of the laminating apparatus of the present invention as well as a sectional view observed from a direction from which a retarder is transported.
Figure 5:
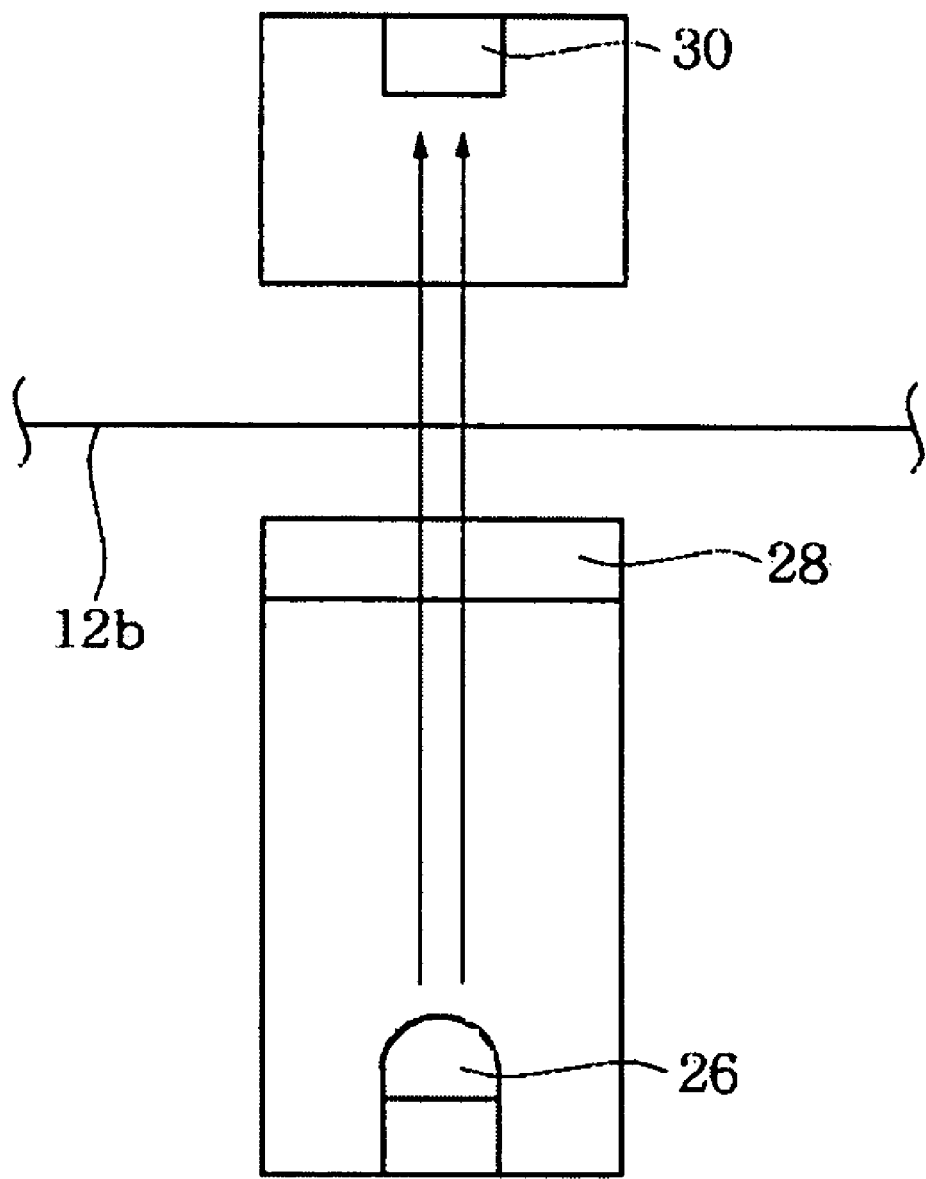
FIG. 5 is a side elevational view of a detector for detecting the angle of the polarizer of the present invention.
Figure 6:
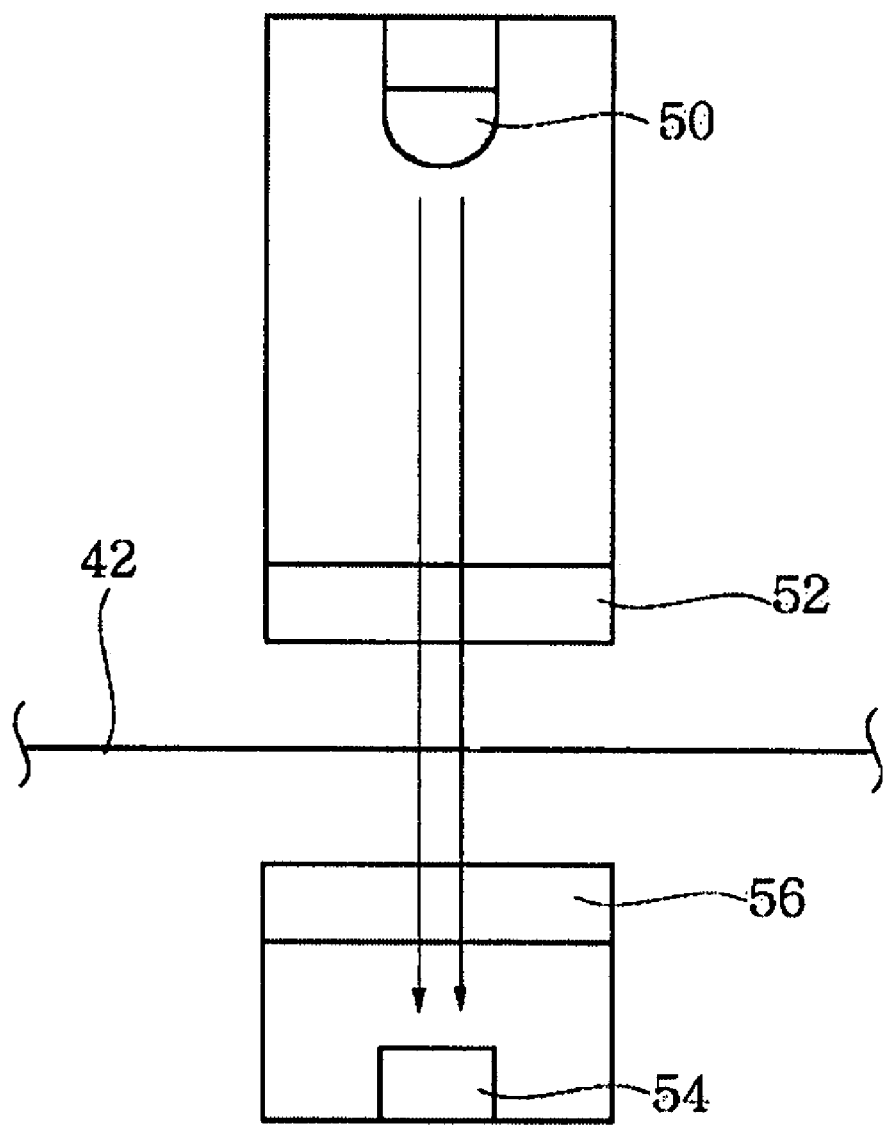
FIG. 6 is a side elevational view of a detector for detecting the angle of the retarder of the present invention.
Figure 7:
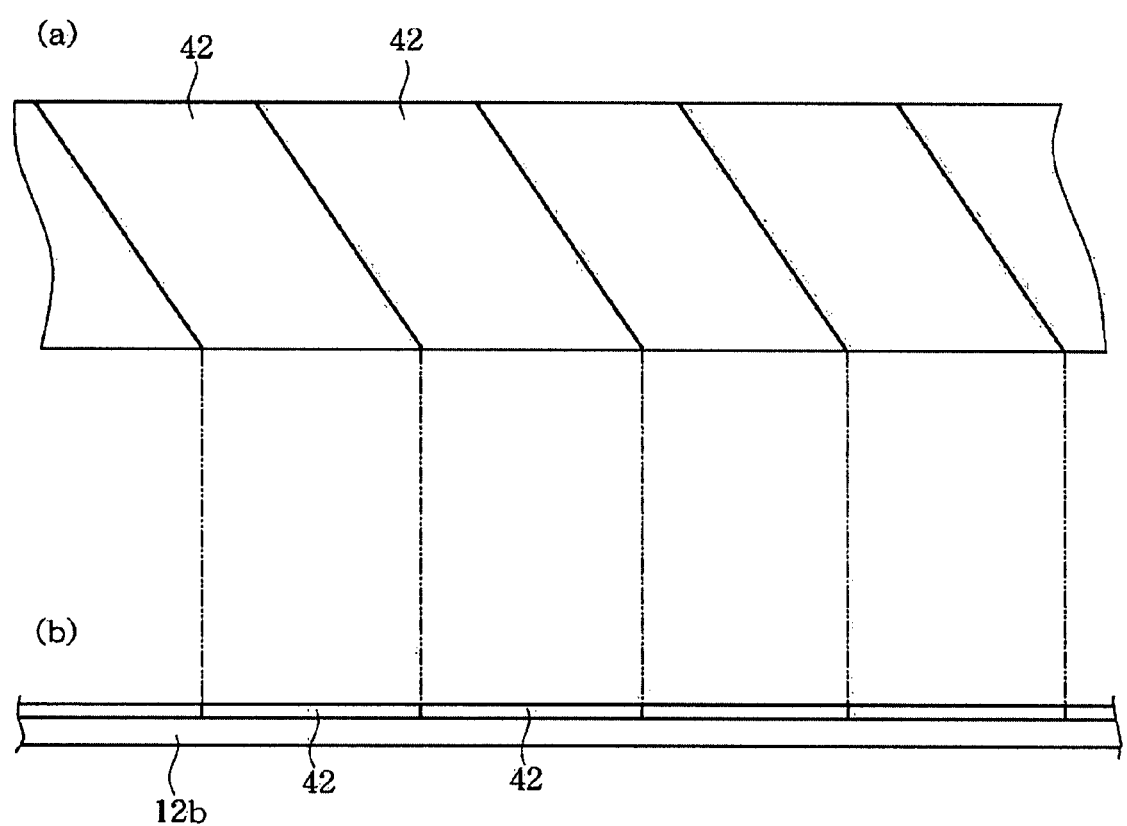
FIG. 7 is a view showing a product manufactured by the laminating apparatus of the present invention.

REFERENCE NUMERALS 10 unwinder
12 film
12a protection film
12b polarizer
24 laminate/punch unit
26 light source
28 polarization device
30 photodetector
34 rewinder
40 unwinder
42 retarder
50 light source
52 polarization device
54 polarizer
56 photodetector
60 rewinder

What is claimed is:

1. A film bonding apparatus for bonding a film having a dichroic property to a film having a birefringent property at an arbitrary angle, comprising:
    an unwinder for the film having the dichroic property in a roll state;
    an unwinder for the film having the birefringent property in a roll state;
    a rewinder for the film having the dichroic property in the roll state;
    a rewinder for the film having the birefringent property in the roll state;
    a device for punching out one of the film having the dichroic property or the film having the birefringent property;
    a detector for the film having the dichroic property for detecting the angle of the axis thereof whose absorption is maximized or minimized in the plane thereof; and
    a detector for the film having the birefringent property for detecting the delay phase axis thereof in the plane thereof,
    wherein an angle between the unwound film having the dichroic property and the unwound film having birefringent property is controlled to bond together the films using the detector for the film having the dichroic property and the detector for the film having birefringent property,
    wherein after the films are bonded, the device for punching out one of the film having the dichroic property or the film having the birefringent property punches out the one film,
    wherein one of the films remaining upon punching-out is cut off from the other films, and the film having the dichroic property and the film having the birefringent property are wound in a roll state, and
    wherein a roll of bonded product is manufactured by continuously carrying out bonding.

2. A film bonding apparatus according to claim 1, wherein the detector for the film having the dichroic property comprises a light source, a polarization device, and a photodetector.

3. A film bonding apparatus according to claim 1, wherein the detector for the film having the birefringent property comprises a light source, a polarization device, and a photodetector.

4. A film bonding apparatus according to claim 2, wherein the detector for the film having the birefringent property comprises a light source, a polarization device, and a photodetector.

5. A film bonding apparatus for laminating a dichroic film having a dichroic property to a birefringent film having a birefringent property at an angle, comprising:

an unwinder for unwinding the dichroic film in a roll state;

an unwinder for unwinding the birefringent film in a roll state;

a rewinder for rewinding the dichroic film; a rewinder for rewinding the birefringent film;

a detector for the dichroic film for detecting an angle of the axis whereat absorption is maximized or minimized in the plane thereof; and a detector for the birefringent film for detecting a slow axis thereof in the plane thereof;

a device for determining and controlling an angle between a path of the dichroic film relative to a path of the birefringent film in response to the detected angle of the axis for the dichroic film and the detected slow axis for the birefringent film;

a device disposed to laminate the dichroic film and the birefringent film; and a punch device disposed to punch out a cut out portion of one of the dichroic film and the birefringent film after lamination;

wherein a remaining portion of the one film that is punched out is rewound by the respective rewinder into a roll state, and wherein the other film having the cut-out portion laminated thereto is rewound by the respective rewinder into a roll state as a rolled laminated product.

6. The film bonding apparatus according to claim 5, wherein the punch device includes a cutting blade that is positioned to move upwardly and cut only the one of the dichroic and birefringent films at edges of the laminated film.

7. The film bonding apparatus according to claim 5, wherein the device for determining and controlling an angle between the path of the dichroic film relative to the path of the birefringent film comprises nip rolls.

8. The film bonding apparatus according to claim 7, wherein the device disposed to laminate the dichroic film and the birefringent film comprises a pressure plate.

* * * * *